United States Patent [19]

Goerke et al.

[11] 4,020,515
[45] May 3, 1977

[54] APPARATUS FOR ASSEMBLING WASHER-SHAPED AND ELONGATED COMPONENTS AND THE LIKE

[76] Inventors: Paul Goerke, 14126 Dearborn, Riverdale, Ill. 60627; Waldemar S. Dyhringer, 257 E. 143rd St., Dolton, Ill. 60419

[22] Filed: Dec. 1, 1975

[21] Appl. No.: 636,686

[52] U.S. Cl. .......................... 10/155 A; 10/162 M; 29/810
[51] Int. Cl.² ........................................ B23P 19/08
[58] Field of Search ............... 29/208 R, 211 M; 10/DIG. 4, 155 R, 155 A, 162 M, 165, 169

[56] References Cited
UNITED STATES PATENTS

| 994,008 | 5/1911 | Knapp et al. | 10/162 M |
|---|---|---|---|
| 2,587,951 | 3/1952 | Anderson | 10/2 |
| 2,914,781 | 12/1959 | Prutton | 10/155 A |
| 3,114,159 | 12/1963 | Yoshikawa | 10/155 A |
| 3,162,874 | 12/1964 | Autio | 10/155 A |
| 3,226,744 | 1/1966 | Marechal et al. | 10/155 A |
| 3,323,155 | 6/1967 | Cooley et al. | 10/155 A |
| 3,638,260 | 2/1972 | Brown et al. | 10/155 A |

Primary Examiner—C.W. Lanham
Assistant Examiner—E. M. Combs
Attorney, Agent, or Firm—Frank J. Uxa

[57] ABSTRACT

An apparatus for placing at least one washer-shaped component, e.g., washer and the like, on an elongated object, e.g., nail, screw, rivet and the like comprises: moveable carrier having at least one receptacle aligned with the groove therein; elongated object inlet to supply elongated objects to the carrier; magnetic elements located at least partially within the groove for attracting and holding elongated objects; inlet means to supply washer-shaped components to the receptacles; assembly plane to urge the elongated object held by the magnetic element through the hole in the washer-shaped component in the receptacle; and an exit for removing and recovering the elongated object and washer-shaped component combination from the carrier.

An improved method for placing washer-shaped components on elongated objects has also been discovered.

8 Claims, 7 Drawing Figures

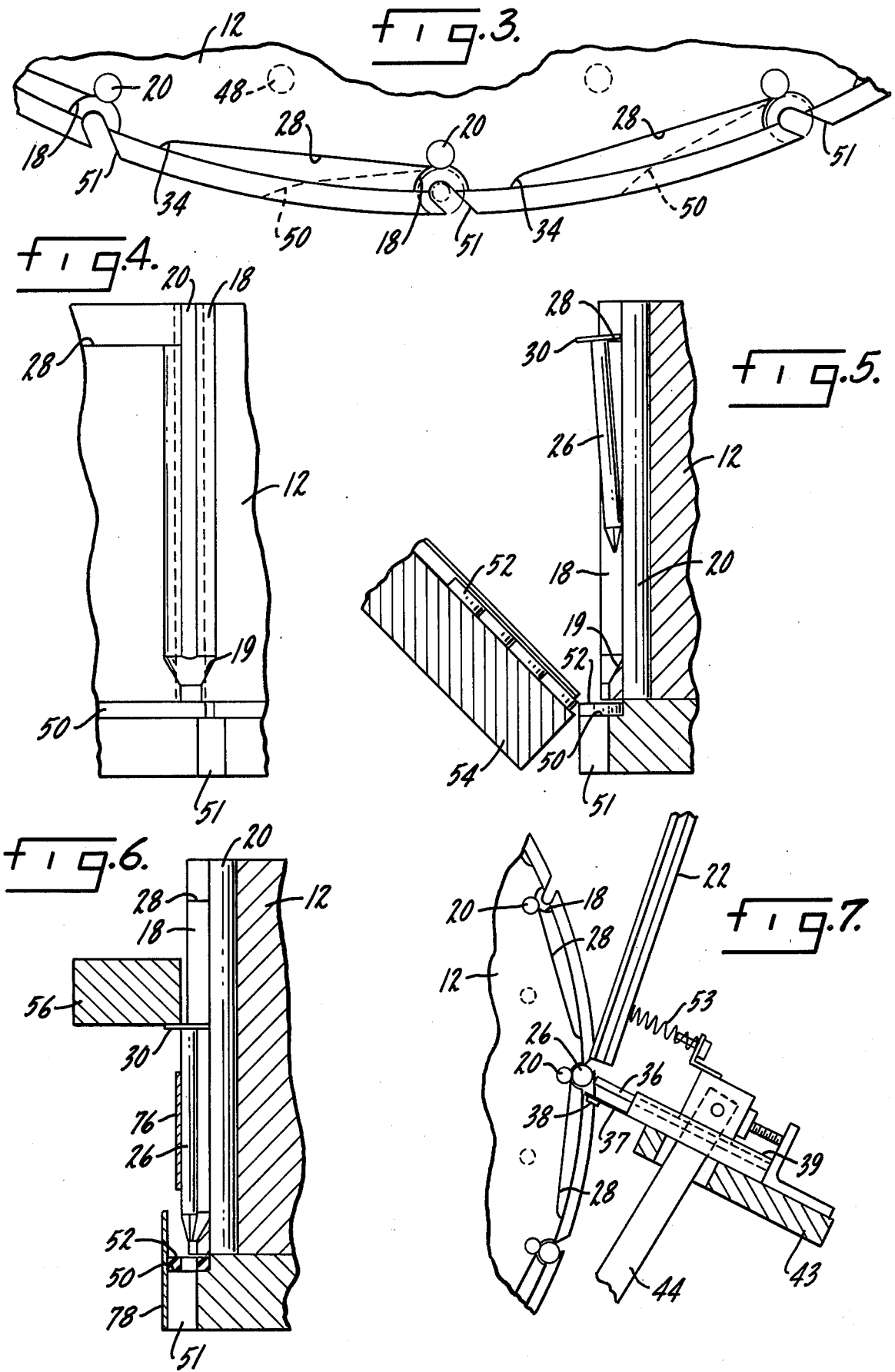

APPARATUS FOR ASSEMBLING WASHER-SHAPED AND ELONGATED COMPONENTS AND THE LIKE

The present invention relates to an improved apparatus and method for handling elongated objects. More particularly, this invention relates to an improved apparatus and method for placing washer-shaped components, e.g., washers and the like, on elongated objects, e.g., nails, screws, rivets and the like.

Combinations of an elongated object, e.g., nail, screw, rivet and the like, and washer-shaped component, e.g., washer and the like, are commercially useful in a number of applications. For example, washered nails which have been painted are useful in affixing painted metal siding to buildings and other structures. Various devices have been used to place washers on such fasteners. However, many of these prior art machines have proven to be unsatisfactory. For example, devices which apply a severe and sudden force to the elongated object may damage, e.g., bend, the object. In addition, certain prior art machines do not place the washer on the elongated objects to a uniform length. This deficiency may result in additional handling problems. A great many of the prior art devices provide washer-elongated object combinations in a manner which results in wasteful additional processing. For example, if the washer-elongated object combinations are randomly aligned, the entire combination, e.g., nail head, nail stem and washer, is usually painted, even though only the top portion of such combination requires such painting. In view of the above, and improved apparatus and method for placing washer-shaped components on elongated objects is desirable.

Therefore, one object of the present invention is to provide an improved apparatus for placing a washer-shaped component on an elongated object.

Another object of the present invention is to provide an improved apparatus for placing a washer-shaped component on an elongated object which will facilitate further processing or handling of the resulting elongated object and washer-shaped component combination.

A still further object of the present invention is to provide an improved method for placing a washer-shaped component on an elongated object. Other objects and advantages of the present invention will become apparent hereinafter.

An improved apparatus for placing at least one washer-shaped component, e.g., washer and the like, on an elongated object, e.g., nail, screw, rivet and the like, to form an elongated object and washer-shaped component combination has now been discovered. In general, the present apparatus comprises moveable carrier means having at least one elongated groove and at least one receptacle aligned with the groove for receiving a washer-shaped component from an inlet means, described hereinafter; magnetic means located at least partially within, preferably alone substantially the entire length of the groove so that, as the carrier means moves, the magnetic means attracts and holds an elongated object from the object inlet means, described hereinafter; assembly means located in proximity to the carrier means so that, as the carrier means moves, the assembly means comes in contact with the elongated object held by the magnetic means to urge this elongated object through the hole of the washer-shaped component in the receptacle; and exit means located in proximity to the carrier means to remove and recover the resulting elongated object and washer-shaped component combination from the carrier means as the carrier means moves. Of course, the present apparatus is also provided with means associated with the moveable carrier means which acts to move the carrier means in a predetermined manner so that the device may function as described herein.

The inlet means of the present apparatus, noted above, is located adjacent to the moveable carrier means to supply washer-shaped components to the receptacles of the moveable carrier means. The washer-shaped component is supplied to the receptacle so that the hole of this washer-shaped component and the axis of the elongated object being attracted to and held by the magnetic means are substantially aligned. This function of the inlet means allows assembly means to urge the elongated object through the hole of the washer-shaped component. The object inlet means, also noted previously, is located adjacent to the moveable carrier means to supply elongated objects to the moveable carrier means. Relative to the motion of the carrier means, the object inlet means may precede, act simultaneously with, or follow the washer-shaped component inlet means. That is, elongated objects may be supplied to the grooves of the carrier means prior to, simultaneously with, or after washer-shaped components are supplied to the receptacles of the carrier means. However, in order to allow the present assembly means to function properly, both elongated objects and washer-shaped components are supplied to the carrier means so that the axis of the elongated object and the hole of the washer-shaped component are substantially aligned.

The present apparatus and method provide an effective and efficient means for placing washer-shaped components on elongated objects. The present apparatus has been found to be fully reliable, easy to operate and, because of a minimum of moving parts, requires reduced maintenance. In short, the present invention provides for rapid and reliable placement of washer-shaped components on elongated objects.

Turning to the present apparatus in more detail, a moveable carrier means is an essential component. The size, e.g., diameter, and configuration of this moveable carrier means is not critical to the present invention. Preferably, the elongated groove of the moveable carrier means is as long as, more preferably longer than, the elongated objects to be processed by the present apparatus. In a preferred embodiment, the present moveable carrier means comprises a rotatable disc having at least one, more preferably a plurality of, elongated grooves located at the periphery of the disc and at least one, more preferably a plurality of, receptacles aligned with such grooves for receiving washer-shaped components. Preferably, the rotatable disc has a maximum transverse dimension from one point on its periphery to another point on its periphery, e.g., diameter, length, width, diagonal and the like (but not including circumference), ranging from about 3 inches to about 120 inches or more, more preferably from about 6 inches to about 60 inches. More preferably, the disc is substantially circular in configuration. The disc preferably has a thickness, preferably a substantially uniform thickness (at least at or near its periphery), greater than the length of the elongated objects to be processed by the present apparatus. The moveable carrier means, e.g., rotatable disc, may be constructed of any suitable material. Typical materials include wood, metals, ceramics, plastics, synthetic composition materials and the like. Preferably, the moveable carrier means directly adjacent to the magnetic means is essentially non-magnetic.

The speed of movement of the moveable carrier means is not critical to the present invention. However, in order to achieve optimal benefits, the carrier means, e.g., disc, should move, e.g., rotate, so that the elongated object-donut shaped component combinations can be formed rapidly without prematurely breaking the attractive bond between the elongated object and the magnetic means. Thus, in a preferred embodiment, the disc rotates at a speed in the range from about 0.1 revolution per minute (rpm) or less to about 200 rpm or more, more preferably from about 1 rpm to about 100 rpm. The movement, e.g., rotation of the carrier means, e.g., disc, can be powered using any conventional means well known in the art. For example, through a series of pulleys connected by belts, electrical or pneumatic energy consumed by a motor or driver can be converted to mechanical energy to provide rotation to the disc.

The object inlet means of the present apparatus is located adjacent to the moveable carrier means, preferably to the periphery of a rotatable disc, to supply elongated objects to the carrier means, e.g., rotatable disc. The object inlet means can, for example, comprise a supply hopper means for storing elongated objects to be processed and a chute means, such as that shown in U.S. Pat. No. 1,324,650, for transporting elongated objects from the supply hopper means to the moveable carrier means.

In a preferred embodiment, each magnetic means located at least partially within the grooves of the rotatable disc, described in detail hereinafter, picks up and holds a single elongated object per revolution of the disc. Thus, the object inlet means preferably comprises a supply hopper means for storing elongated objects; chute means for transporting elongated objects from the supply hopper means in a single file array toward a supply means; supply means located adjacent to the termination of the chute means for supplying the next single elongated object in the chute means to be picked up and held by a magnetic means to the magnetic means; and pin means located on the disc, the number of pin means being equal to the number of magnetic means, whereby the supply means is mechanically responsive to the movement of the pin means so that as the disc rotates, the next elongated object, referred to above, is supplied to the magnetic means. After the elongated object is supplied to the magnetic means, the single elongated object nearest the termination of the chute means moves into proper position to be acted upon by the supply means. In this manner, elongated objects are supplied to the magnetic means on a one-by-one basis.

A further essential component of the present apparatus is at least one magnetic means located at least partially within the grooves of the moveable carrier means, e.g., rotatable disc. As the carrier means moves, the magnetic means picks up and holds one elongated object from the object inlet means, described above. The magnetic means holds the elongated object in a substantially vertical position relative to the movement, e.g., rotation, of the carrier means, e.g., disc. Each of the magnetic means preferably has a vertical dimension equal to or greater than the length of the elongated objects to be processed by the present apparatus. Such relationship between the lengths of the magnetic means and the elongated objects provides that the elongated objects will be securely held by the magnetic means so that the present apparatus may provide optimum benefits.

In one particularly preferred embodiment, one magnetic means is embedded, e.g., notched, into each of the grooves of the moveable carrier means, e.g., rotatable disc. In this embodiment each magnetic means comprises at least one elongated rod of magnetized material located at least partially within a groove of the moveable carrier means. In certain instances, e.g., when elongated objects having a length greater than about 3 inches are to be processed, two or more rods of magnetized material with their poles properly aligned, may preferably be employed as a single magnetic means to provide optimum attraction between the magnetic means and the elongated objects.

Thus, in a preferred embodiment, the rotatable disc is provided, e.g., by machining, with a groove or grooves at or near its periphery, which grooves run the entire thickness of the disc. These grooves receive the rods of magnetized material. These rods are, of course, positioned in the grooves so as to be able to pick up and hold elongated objects from the object inlet means. In this preferred embodiment, the grooves are constructed so that the edges of the grooves further act to maintain the elongated objects held by the rods in a substantially vertical position relative to the rotation of the disc.

The specific number of grooves, receptacles and magnetic means included in the present apparatus is not critical to the present invention and depends, for example, on the size and speed of movement, e.g., rotation, of the carrier means, e.g., disc. Thus, the number of grooves, receptacles and magnetic means may preferably range from 2 to about 400 or more, more preferably from about 4 to about 200.

The magnetic means of the present apparatus may be made of any material or combination of materials which can be magnetized. Therefore, the specific magnetic material or materials used may be those which are conventional and well known in the art. Of course, the magnetic means must be constructed of such material(s) which is capable of picking up and holding the elongated objects to be processed by the present apparatus. In one preferred embodiment, the magnetic means cmprises a metal selected from the group consisting of iron, cobalt, nickel and mixtures thereof. Examples of such suitable metals include iron, carbon steel, silicon-iron (4% by weight of silicon and 95% by weight of iron); sendust (9% by weight of silicon, 5% by weight of aluminum and 85% by weight of iron), nickel-iron alloys (e.g., 45% by weight of nickel and 55% by weight of iron), iron-nickel-copper alloys, iron-nickel-molybdenum alloys, iron-nickel-chromium-copper alloys, iron-nickel-copper-molybdenum alloys, iron-cobalt alloys, iron-cobalt-vanadium alloys, iron-tungsten-manganese alloys (e.g., tungsten steel), iron-chromium-manganese alloys (e.g., KS magnet steel), iron-cobalt-chromium-manganese alloys (e.g., cobalt-chrome steel), iron-cobalt-molybdenum alloys, iron-cobalt-tungsten alloys, iron-nickel-aluminum alloys, iron-cobalt-nickel-aluminum-copper alloys (e.g., Alnico 2), iron cobalt-nickel-aluminum-titanium alloys, platinum-cobalt alloys, and the like. In a more preferred embodiment, the magnetic means comprises a major amount of iron, carbon steel and mixtures thereof.

The washer-shaped components inlet means of the present apparatus acts to supply a single washer-shaped component, e.g., a washer, to each of the receptacles so that the hole of the washer-shaped component and the vertical axis of the elongated object attracted to and held by the magnetic means located at least partially within the corresponding groove are substantially aligned. Such substantial alignment allows for rapid and efficient entry of the elongated object through the hole of the washer-shaped component. The particular configuration of the donut inlet means is not critical to the present invention. For example, such inlet means may comprise a supply hopper for storing washer-shaped components to be processed by the present apparatus, chute means in communication with the supply hopper for transporting washer-shaped components, preferably by gravity, in a single file array, i.e., one-by-one, from the supply hopper to the receptacle or receptacles of the moveable carrier means, e.g., rotatable disc. Other specific illustrations of such inlet means which can be employed in the present apparatus are set forth in U.S. Pat. Nos. 3,226,744; 3,622,039 and 3,654,650. Clearly, such inlet means may be conventional and well known in the art.

Each of the receptacles which receive one washer-shaped component from the inlet means are preferably shaped so that the washer-shaped component in the receptacle is in proper alignment with the elongated object held by the magnetic means, noted above. In a particularly preferred embodiment, the receptacle is located on the moveable carrier means such that when both the elongated object and washer-shaped components are first held by the magnetic means and received in the corresponding receptacle, respectively, such elongated object and washer-shaped component do not contact or touch each other. For example, when the moveable carrier means comprises a rotatable disc, the elongated object is initially attracted to and held by the magnetic means at the upper portion of the rotatable disc, whereas the corresponding receptacle is located at the lower portion of the rotatabled disc. Thus, as the disc rotates, the assembly means preferably acts on the elongated object to gradually urge such object downwardly through the hole of the washer-shaped component to form the desired elongated object and washer-shaped component combination.

The assembly means of the present apparatus is located in proximity to the moveable carrier means so that as the carrier means moves, the assembly means comes in contact with the elongated object held by the magnetic means to urge, preferably gradually, the elongated object through the hole in the washer-shaped component, e.g., washer, to form the desired elongated object-donut-shaped component combination. In a preferred embodiment, the assembly means comprises an essentially stationary slanted plane situated so that such plane slants downwardly relative to the direction of movement of the carrier means, e.g., to the direction of the disc rotation. In this embodiment, the top end, preferably the head portion, of the elongated object being held by the magnetic means comes in contact with the slanted plane at some point at or below the upper edge of the slanted plane. The combination of carrier means movement, e.g., disc rotation, and the essentially stationary slanted plane acts to gradually (depending on the angle of the slanted plane) urge the elongated object through the hole in the washer-shaped component in the coresponding receptacle to form the elongated object and washer-shaped component combination.

In a further preferred embodiment, the angle of incline of the essentially stationary slanted plane is adjustable to provide the present apparatus with greater flexibility, e.g., the ability to process elongated objects having widely varying lengths.

The present apparatus further includes at least one exit means to remove and recover the elongated object and washer-shaped component combination from the carrier means as the carrier means moves, e.g., after the assembly means. Each exit means comprises removal means located in proximity to the moveable carrier means, e.g., the disc, for removing the assembled combinations which come in contact with the removal means from the magnetic means; and a transport means for transporting the assembled combinations thus removed for further processing, e.g., storage, painting, other finishing operations and the like. One particular advantage of the present invention results from the assembled combinations being presented to the exit means in an orderly, preferably single file array. Thus, the trasnparent means can very easily carry the assembled combination away from the carrier means for additional processing. In one preferred embodiment, the removal means comprises a plurality of second magnetic means which act to attract and hold the assembled combinations from the carrier means. These second magnetic means are affixed to the transport means which acts to send the assembled combinations held by the second magnetic means, to further processing. The movement of the second magnetic means preferably is synchronized with the movement of the present carrier means so that assembled combinations can be efficiently transferred from the carrier means to the exit means. In such embodiment, the second magnetic means can be made of any conventional material or materials which can be magnetized, as described hereinbefore. Also, the transport means can be powered by any conventional power source, and the configuration of such transport means is not critical to the present invention.

In general, and except as otherwise provided for herein, the apparatus of the present invention may be fabricated from any suitable material or combination of materials of construction. The material of construction used for each component of the present apparatus may be dependent upon the particular application involved. Of course, the apparatus should be made of materials which are substantially unaffected, except for normal wear and tear, by the conditions at which the apparatus is normally operated. In addition, such material or materials should have no substantial detrimental effect on the elongated objects or donut-shaped components being processed.

These and other aspects and advantages of the present invention are set forth in the following detailed description and claims, particularly when considered in conjunction with the accompanying drawings in which like parts bear like reference numerals. In the drawings:

FIG. 3 is a partial top plan view of the apparatus shown in FIG. 1.

FIG. 4 is a partial front view of the apparatus shown in FIG. 3.

FIG. 5 is a section view of the apparatus shown in FIG. 1 taken along line 5—5.

FIG. 6 is a section view of the apparatus shown in FIG. 1 taken along line 6—6.

FIG. 7 is a top plan view of a portion of the object inlet means shown in FIG. 1.

Figure 1:
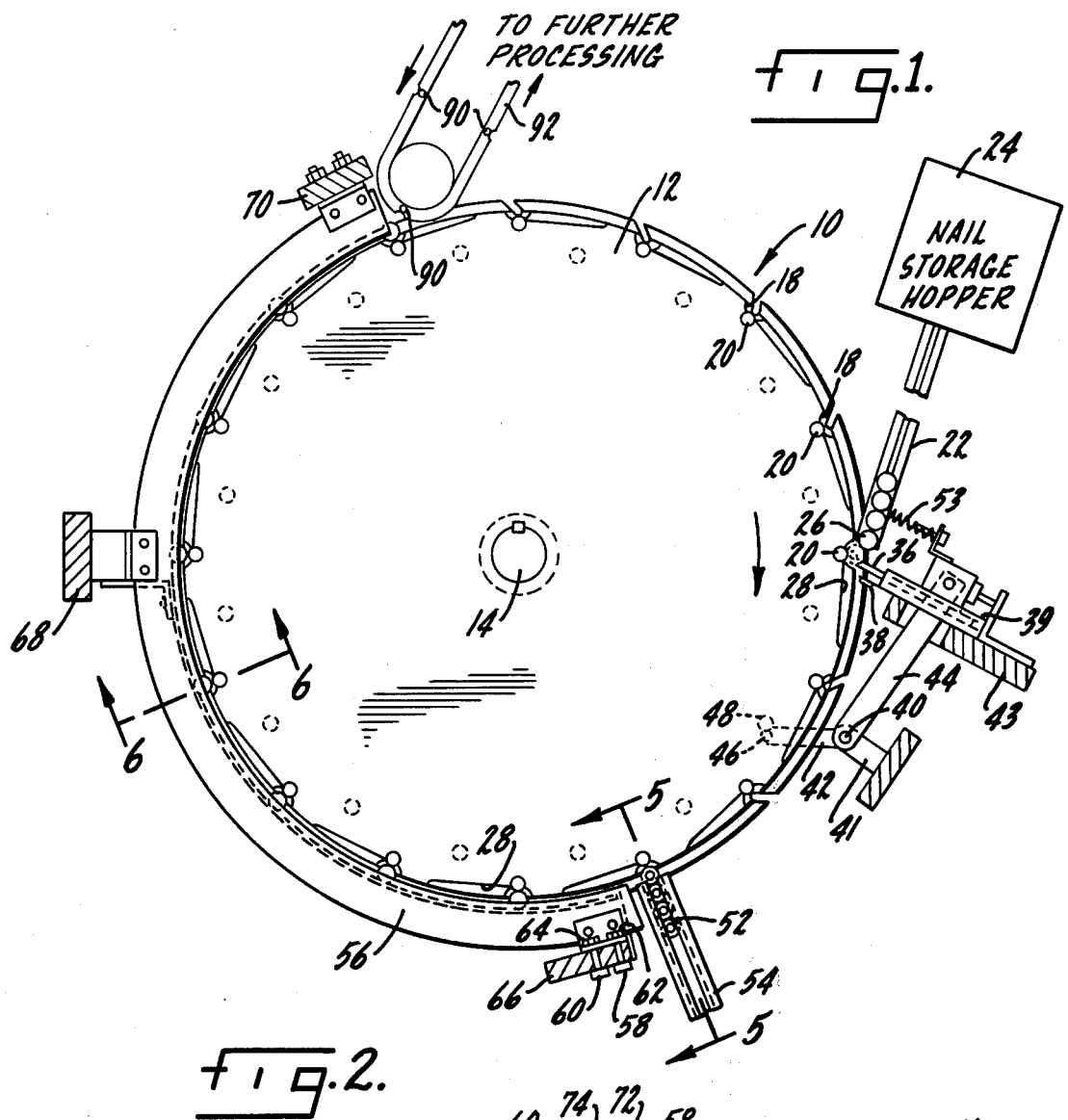
FIG. 1 is a top plan view of one embodiment of the apparatus of the present invention.

Referring now to the drawings, the embodiment of the present apparatus shown, referred to generally as 10, involves a rotatable disc 12 having, except as described hereinafter, a substantially uniform thickness. Rotatable disc 12 rotates in the direction shown in FIG. 1. As shown in FIG. 1, rotatable disc 12 is securely attached through its center to shaft 14 which rotates in response to variable speed motor 16. In this manner, disc 12 is rotated.

Rotatable disc 12 includes a series of notches 18 located at the periphery of disc 12. Each of the notches 18 includes a lower portion 19, as shown in FIGS. 4 and 5, which is tapered. Wedged snugly partially within each of these notches 18 is a magnetic iron rod 20.

In the embodiment shown in FIG. 1, inclined chute 22 transports, e.g., by gravity, the elongated objects, e.g., nails, to be processed in a single file array from nail storage hopper 24 to the proximity of the rotatable disc 12. As disc 12 rotates, each magnetic iron rod 20 partially within the corresponding notch 18 acts to pick up (after the individual nail 26 is released by the nail supply mechanism, described in detail hereinafter) and hold a single nail 26 in a substantially vertical position, as shown in FIG. 5.

In the embodiment illustrated, rotatable disc 12 includes recesses 28, shown in FIGS. 3 and 4, which may act to receive the head portion 30 of nail 26 released by the nail supply mechanism prior to the nail 26 being held by magnetic iron rod 20. Thus, recess 28 functions in such a manner that the head portion 30 of nail 26 may be received in recess 28. As disc 12 rotates, the edge of nail chute 22, shown in FIG. 1, comes in contact with nail 26 and holds it in such a position that the nail 26 will be attracted to and held by the next magnetic iron rod 20 which passes by. In this fashion recess 28 reduces the amount of synchronization necessary between the movement of disc 12 and the nail supply mechanism. Associated with recesses 28 are pegs 34, shown in FIG. 3, which extend up from the level of the recesses 28 to the top surface of disc 12. Pegs 34 act to insure that each nail 26 released by the nail supply mechanism is picked up and held by a magnetic iron rod 20 as the rod 20 rotates by.

The nail supply mechanism, referred to above, acts to segregate and release the next single nail 26 to be picked up and held by a magnetic iron rod 20 using finger 36. The nail supply mechanism is associated with nail storage hopper 24 and nail chute 22, described previously, to make up the object inlet means of the present apparatus.

Figure 2:
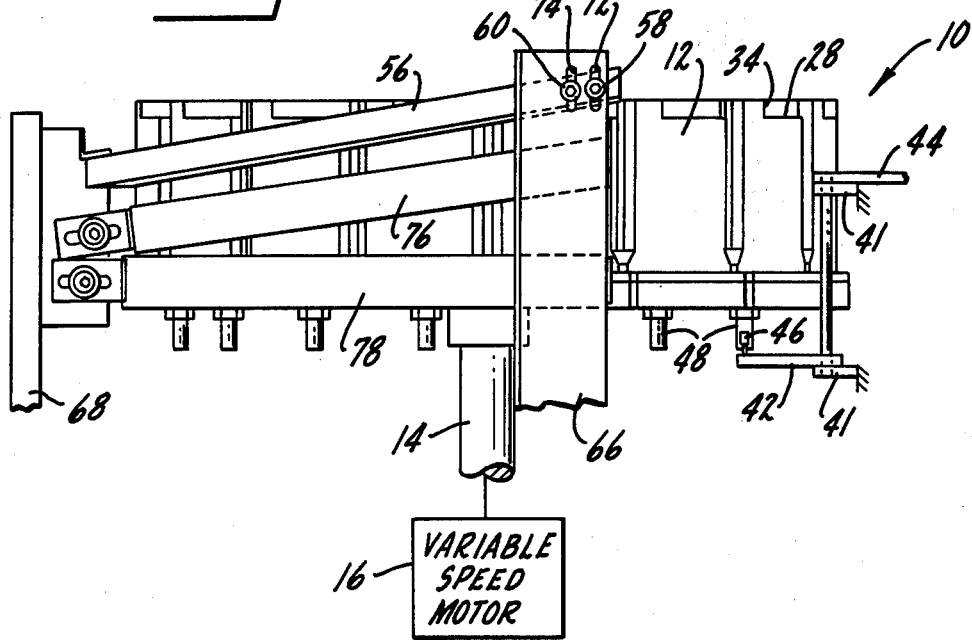
FIG. 2 is a side view of the apparatus shown in FIG. 1.

Both moveable rod 42 and member 44 are attached to rotatable shaft 40. Shaft 40, which is supported by stationary bases 41, rotates in response to the generally opposing movements of moveable rod 42 and member 44. In turn rod 42 is attached to wheel 46 which comes into contact with pins 48 on rotatable disc 12. The number of pins 48 on rotatable disc 12 is equal to the number of magnetic iron rods 20. These pins 20 are placed on rotatable disc 12 so that single nails 26 will be released from backstop 37 of nail chute 22 by finger 36, and picked up and held by each magnetic iron rod 20 as the rod 20 rotates by the backstop 37 of nail chute 22. Further, member 44, which is also supported by upper stationary base 41 (as shown in FIG. 2), moves in response to the force of spring member 53, to one end of which it is attached. The other end of spring member 53 is attached to the base of nail chute 22.

The movements of rod 42 and member 44 are generally opposing. Thus, when wheel 46 is in contact with a pin 48, shaft 40 will rotate so that the position of finger 36 will be as shown in FIG. 7. In this position, finger 36 releases (from the backstop 37 of nail chute 22) the next individual nail 26 to be picked up and held by the next magnetic iron rod 20. As wheel 46 loses contact with pin 48, the force of spring member 53 acts through member 40 to rotate shaft 40 so that finger 36 moves away from disc 12 a sufficient distance to allow the next single nail 26 in nail chute 22 to move up against backstop 37. Separate magnet 38 is attached to the opposite side of backstop 37 to attract and properly position, e.g., substantially vertically, the next nail 26 against backstop 37. The entire cycle is repeated each time wheel 46 comes into contact with a pin 48 on rotatable disc 12. In this fashion, nails 26 are released and supplied from nail chute 22 to the magnetic iron rods 20 of disc 12 on a one-by-one basis. Finger 36 is positioned in housing 39 which is, in turn, attached to stationary support 43. Stationary support 43 also aids in supporting one end of member 44. Although elongated objects of varying lengths may be processed by the present apparatus, it is preferred that the elongated objects processed at any one time by the present apparatus be of substantially equal length and configuration.

Rotatable disc 12 includes containers 50 shown in FIG. 1, which are equal in number with the magnetic iron rods 20 and the pins 48. Containers 50 are positioned generally below notches 28 and magnetic iron rods 20. Containers 50 act to receive washers 52 from inclined washer chute 54. Inclined washer chute 54 acts to transport washers 52 from a washer supply hopper (not shown) in a single file array by gravity to the containers 50 of rotatable disc 12. As can be most clearly seen in FIG. 3, each container 50 has a sloping backwall, with the maximum depth of the container 50 into rotatable disc 12 being at the end directly below notch 18. As the disc 12 rotates past washer chute 54, a single washer 52 enters into the shallow end of a container 50. As the disc 12 continues to rotate, the next washer 52 in the washer chute 54 continues in contact with the washer which has entered the container 50. This contact and the rotation of disc 12 urges the washer 52 in the container 50 toward the deepest portion of the container 50. Once the washer 52 is so positioned in container 50, the hole of this washer 52 is directly above the termination of notch 18 and substantially in alignment with the vertical axis of nail 26 which is held by the corresponding magnetic iron rod 20, as shown in FIG. 5. Rotatable disc 12 also includes passageways 51, as shown in FIGS. 1 and 3, which perforate both the ceiling and floor of each container 50 and extend through the lower surface of disc 12. Passageways 51 act so that the stem or shaft of nails 26 held by magnetic iron rods 20 can be inserted in the holes of washers 52 while the washers 52 are held in containers 50. Passageways 51 are suitably slanted, as shown in the drawings, to allow optimal efficiency in removing the nail-wahser combination from the rotatable disc 12.

Adjustable slanted plane 56 is connected, using bolts 58 and 60, and nuts 62 and 64, to a stationary base 66. Adjustable slanted plane 56 is additionally supported by stationary bases 68 and 70. FIG. 2 illustrates that the angle of incline of slanted plane 56 can be altered depending, for example, on the length of the nails 26 to be processed. For example, nuts 62 and 64 can be loosened and the angle at which slanted plane 56 is inclined to disc 12 can be changed. When nuts 62 and 64 are again tightened to set the new angle of inclination between slanted plane 56 and disc 12, bolts 58 and 60 will be in a different position relative to slots 72 and 74, thus reflecting the change in inclination angle. Slanted plane 56 is inclined in a generally downward direction relative to the direction of rotation of disc 12. Slanted plane 56 is situated so as to come in contact with the head portion 30 of each of the nails 26 held by the magnetic iron rods 20 as disc 12 rotates by slanted plane 56, as shown in FIG. 6. Since slanted plane 56 is inclined downwardly with respect to the rotation of disc 12, the contact between slanted plane 56 and head portion 30 plus the rotation of disc 12 urges nails 26 held by magnetic iron rods 20 down past the tapered portion 19 of notch 18 through the hole in washer 52 in the corresponding container 50 to thereby form the desired nail-washer combination.

As shown in FIGS. 2 and 6, associated with the slanted plane 56 are first belt 76 and second belt 78. Both first belt 76 and second belt 78 are attached to stationary bases 66 and 68. First belt 76, as shown most clearly in FIG. 6, acts to maintain the nail 26 in proper position during the initial downward urging of the nail 26 by the slanted plane 56 and the rotation of disc 12. At the same time, second belt 78 acts to maintain the washer 52 in container 50 in the proper position.

After the disc 12 rotates past slanted plane 56, the head porttion 30 of the resulting nail-washser combination is still held by the magnetic iron rod 20. Second magnetic iron rods 90, secured to conveyor 92, are positioned so that the magnetic force of the second rods 90 overcomes the force of magnetic iron rods 20 and, as a result, removes the nail-washer combination from the rotatable disc 12 and transports the same in a single file, regular, e.g., vertical, array, to a recovery or storage location, or to further processing. After the nail-washer combination has been removed from the magnetic iron rod 20, the disc 12 continues to rotate so that the same magnetic iron rod 20 picks up and holds another nail released by the nail supply mechanism and the cycle is repeated.

While the attached drawings specifically illustrate the formation or construction of a nail-washer combination, the apparatus of the present invention may be used to produce any elongated object and washer-shaped component combination. However, such elongated objects should be constructed of such material as to be capable of being picked up and held by the magnetic means of the present apparatus. Such materials include, for example, various metals such as iron and iron alloys. Many of the materials listed previously may be used in the construction of such nails, screws, rivets and the like. Preferably, the elongated objects processed according to the present invention have a head portion which has a larger cross-sectional area then the stem or shaft of the object, such as nails 26. The present apparatus finds particular applicability to producing combinations of (1) nails, screws, rivets and the like and (2) washers. The size and type of such nails, screws, rivets and the like are not critical to the present invention. For example, these objects can have lengths from less than about ½ inch to lengths of about 12 inches or more, preferably from about ½ inch to about 8 inches in length. The stem or shaft of the nails, screws, rivets and the like can have diameters (i.e., the largest transverse dimensions across the cross-section normal to the vertical axis of the stem) ranging from about 1/16 inch to about 1 inch or more, preferably from about ⅛ inch to about ½ inch. Such nails, screws, rivets and the like often include a head portion. This head portion may be of any suitable size or shape. The washers which are particularly applicable to the present invention may be constructed of any suitable material, e.g., many materials are conventional and well known in the art. For example, the washers may be constructed of a rubber-like material, e.g., natural rubber, neoprene, synthetic rubbers and the like. The size and configuration of the washers used are not critical to the present invention. However, the hole of the washer should be properly sized so as to receive and retain the stem or shaft of the elongated object being used so that the desired elongated object-washer combination can be produced.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. An apparatus for placing at least one washer-shaped component on an elongated object to form an elongated object and washer-shaped component combination which comprises:

moveable carrier means having at least one elongated groove therein and at least one receptical aligned with said groove for receiving a washer-shaped component;

object inlet means located adjacent to said moveable carrier means to supply an elongated object to said carrier means;

magnetic means located on said carrier and positioned with respect to said groove, said means exerting magnetic forces so that as said carrier means moves, said magnetic forces attract and hold said elongated object from said object inlet means at least partially within said groove;

inlet means located adjacent to said moveable carrier means to supply a washer-shaped component to said receptacles of said carrier means so that the hole of said washer-shaped component is positioned in said receptacle in substantial alignment with the axis of said elongated object which is attracted to and held in said groove by said magnetic means on said carrier;

assembly means located in proximity to said carrier means so that, as said carrier means moves, said assembly means comes in contact with said elongated object held by said magnetic means to urge said elongated object through the hole of said washer-shaped component in said receptacle to form said elongated object and washer-shaped component combination; and exit means located in proximity to said carrier means to remove and recover said elongated object and water-shaped component combination from said carrier means as said carrier means moves.

2. The apparatus of claim 1 wherein said moveable carrier means comprises a rotatable disc having at least one elongated groove located at or near the periphery of said disc and at least one receptacle aligned with said groove for receiving washer-shaped components.

3. The apparatus of claim 1 which comprises a plurality of said magnetic means.

4. The apparatus of claim 2 which comprises a plurality of said magnetic means.

5. The apparatus of claim 4 wherein said assembly means comprises an essentially stationary plane situated so that said plane slants downwardly relative to the direction of rotation of said disc.

6. The apparatus of claim 5 wherein said object inlet means comprises supply hopper means for storing elongated objects; chute means for transporting elongated objects from said supply hopper means in a single file array toward a supply means; supply means located at the termination of said chute means for supplying the next single elongated object to be picked up and held by said magnetic means to said magnetic means; and pin means located on said disc, the number of said pin means being equal to the number of said magnetic means, whereby said supply means is mechanically responsive to the movement of said pin means so that as said disc rotates, the next elongated object is supplied to said magnetic means.

7. The apparatus of claim 6 wherein said exit means comprises removal means located in proximity to said rotatable disc for removing said combination which comes into contact with said removal means from said magnetic means and a transport means from transporting said combination thus removed away from said rotatable disc.

8. The apparatus of claim 7 wherein said removal means comprises a plurality of second magnetic means which act to attract and hold said combination from said rotatable disc.

* * * * *